United States Patent [19]

Glass

[11] 4,452,215

[45] Jun. 5, 1984

[54] FUEL SYSTEM FOR INTERNAL COMBUSTION ENGINES

[75] Inventor: James W. Glass, New Castle, Pa.

[73] Assignee: Ennco Inc., Las Vegas, Nev.

[21] Appl. No.: 421,898

[22] Filed: Sep. 23, 1982

Related U.S. Application Data

[63] Continuation-in-part of Ser. No. 321,820, Nov. 16, 1981, Pat. No. 4,423,716.

[51] Int. Cl.³ .......................................... F02M 31/00
[52] U.S. Cl. .................................... 123/557; 123/549; 123/552
[58] Field of Search ............... 123/557, 552, 525, 527, 123/549; 48/180 C, 180 H

[56] References Cited

U.S. PATENT DOCUMENTS

| | | | |
|---|---|---|---|
| 1,931,698 | 10/1933 | Holzapfel | 123/525 |
| 2,744,387 | 5/1956 | Reed | 123/557 |
| 3,509,859 | 5/1970 | Pantano | 123/557 |
| 4,092,963 | 6/1978 | Vrouman | 123/557 |
| 4,112,889 | 9/1978 | Harpman | 123/557 |

Primary Examiner—Ronald H. Lazarus
Attorney, Agent, or Firm—Harpman & Harpman

[57] ABSTRACT

A fuel system for an internal combustion engine of the piston type vaporizes liquid fuel such as gasoline and delivers the same through inter-communicating control valves, one of which is responsive in operation to inlet manifold pressure in the internal combustion engine and the other responsive in operation to accelerator linkage controlling the internal combustion engine's operation. The system's principal point of novelty is a hot fuel gas generator which combines a heat exchanger preferably electrically energized and a communicating valve which is responsive in operation to inlet manifold pressure. The system includes a device for delivering liquid fuel to the hot fuel gas generator and means establishing communication between the inlet manifold pressure responsive valve, the accelerator linkage actuated control valve, and an adaptor block mounted on the inlet manifold of the internal combustion engine. A conventional carburetor may be carried on the adaptor block along with a conventional air cleaner as known in the art. A blower may deliver hot air under pressure to the air cleaner and another device delivers a controlled amount of hot water vapor as steam to the carburetor when a predetermined number of revolutions per minute of the engine is reached.

6 Claims, 8 Drawing Figures

FUEL SYSTEM FOR INTERNAL COMBUSTION ENGINES

This application is a continuation in part of application Ser. No. 321,820, filed Nov. 16, 1981 now U.S. Pat. No. 4,423,716.

BACKGROUND OF THE INVENTION (1) Field of the Invention:

This invention relates to fuel systems and fuel gas generators for internal combustion engines.

(2) Description of the Prior Art:

Fuel systems for internal combustion engines have generally used carburetors in which the gasoline is sprayed into a stream of air and divided into a series of fine droplets approaching vaporization and conveyed to the point of combustion by way of the inlet manifold of the engine. Only those molecules at the surface of the gasoline droplets are in a position to react with another species (oxygen) and incomplete combustion results because the very short time allowed is insufficient for more than a little vaporization of the fuel to occur. Internal combustion engines therefore exhaust large quantities of unburned hydrocarbons, carbon monoxide and oxides of nitrogen, all of which are undesirable atomospheric pollutants.

Attempts to improve such fuel systems have included so-called fuel injection systems wherein liquid fuel is injected directly into the inlet manifold of the engine again resulting in only partial vaporization of the fuel although affording improved measurement of the quantities of fuel provided.

Several attempts to improve vaporization through fuel gasification have been made and such devices may be seen in U.S. Pat. Nos. 3,968,775 and 4,112,889 wherein prior devices are disclosed. The devices disclosed in these patents were unable to supply a gaseous fuel to an internal combustion engine under all operating conditions.

Other attempts to produce a gaseous fuel for an internal combustion engine may be seen in U.S. Pat. Nos. 4,023,538, 4,050,419, 4,114,556, 4,145,988, 4,197,819 and 4,333,422.

The inventions disclosed in this group of patents introduce water into the liquid fuel and attempted simultaneous vaporization thereof. Devices formed in accordance with these several patents perform satisfactorily under ideal operating conditions, but were frequently ineffective due to the separation of the liquid fuel vapor and steam into droplets which resulted in incomplete combustion of the fuel mixture and occasional stalling of the internal combustion engines equipped with the devices. Ideal operating conditions for such devices required substantially uniform revolutions per minute or steady miles per hour operation.

This invention relates to a fuel system and vaporizer for an internal combustion engine, the system including a novel fuel gas generator in the form of a double chambered hollow body in one chamber of which liquid fuel, such as gasoline, is introduced. The chamber is maintained at an optimum temperature sufficient to instantly vaporize the liquid fuel by an adjacent heat exchanger, preferably one or more electrically energized resistance heating elements. The hot gaseous fuel produced flows through a valve controlled orifice into the other one of the double chambers in said hollow body, the valve controlling said flow being responsive in operation to inlet manifold pressure in the engine to which the fuel generator is connected. Hot fuel gas flows from said other chamber through an insulated passageway to and through a mechanical valve actuated by the accelerator linkage controlling said engine and into the inlet manifold thereof by way of an adaptor plate on which the usual carburetor is mounted. The butterfly valve of the carburetor is actuated by the same accelerator linkage. Water vapor as superheated steam from a suitable source is introduced into the carburetor below the butterfly valve and mixes with the hot fuel gas directed into the inlet manifold. The superheated steam is generated in a separate combination control valve and heat exchanger, the control valve being responsive in operation to the revolutions per minute of the engine and the heat exchanger preferably an electrically energized resistance heating element.

SUMMARY OF THE INVENTION

A fuel system and vaporizer for an internal combustion engine is disclosed in which gasoline is vaporized to produce a hot gaseous fuel under pressure. The system incorporates control valves, one of which is responsive in operation to inlet manifold pressure and the other of which is controlled by the positioning of the accelerator linkage used to control the operation of the engine. The fuel leaving the two control valves enters the inlet manifold of the internal combustion engine through an apertured adaptor plate on which a conventional carburetor and air cleaner are mounted and used for directing combustion air into the inlet manifold. A controlled amount of water vapor as superheated steam is introduced into the inlet manifold by way of the carburetor where it acts to space the molecules of the hot vaporized fuel.

DESCRIPTION OF THE PREFERRED EMBODIMENT

Figure 1:
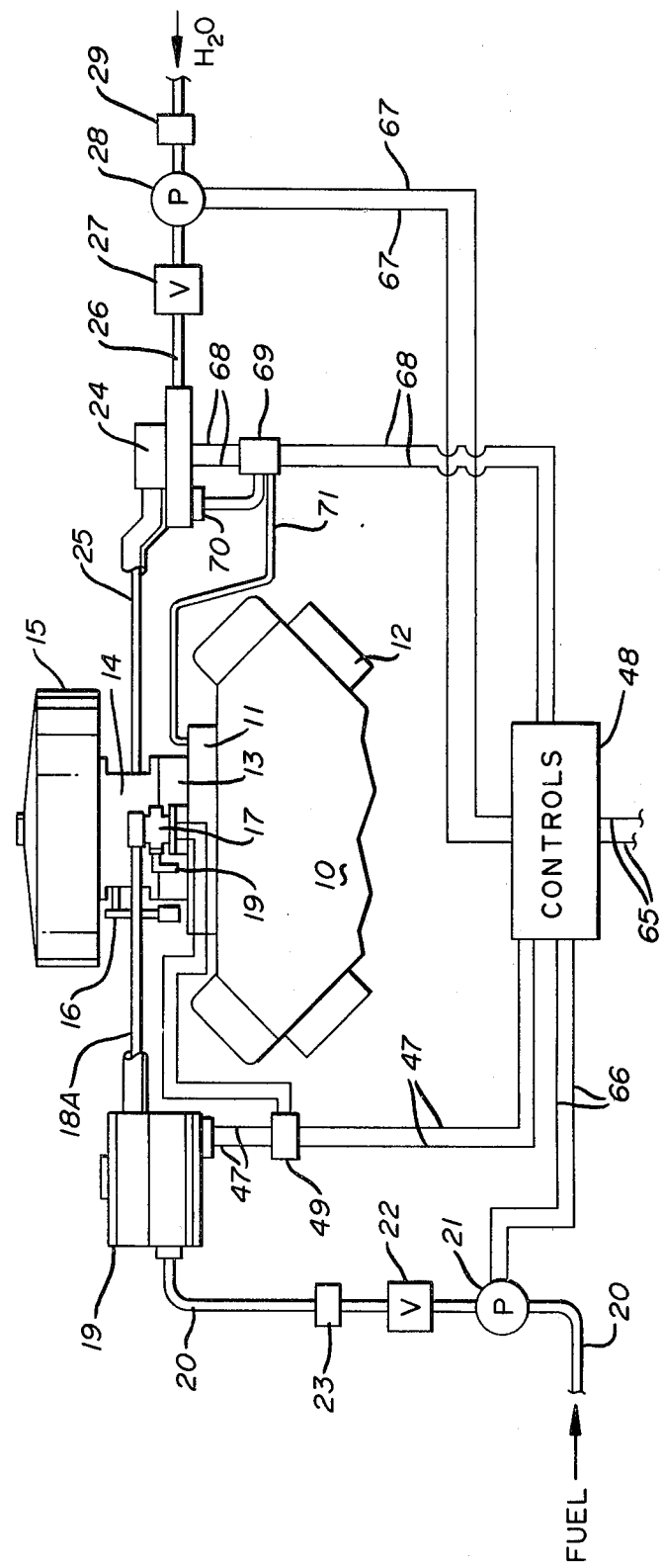
FIG. 1 is a diagrammatic illustration of the novel fuel system.

By referring to the drawings and FIG. 1 in particular, a diagrammatic illustration of the fuel system and vaporizer in communication with an internal combustion engine may be seen in which the engine is indicated by the numeral 10, the inlet manifold thereof by the numeral 11, and the exhaust manifolds thereof by the numerals 12. An adaptor plate 13 is mounted on the inlet manifold 11 in communication therewith and it supports a carburetor 14 which in turn carries an air cleaner 15 so that combustion air may be delivered thereby to the inlet manifold 11. The carburetor 14 contains the usual butterfly valve controlling combustion air and the accelerator controlled linkage 16 for controlling the same extends outwardly at one side of the carburetor 14. A mechanical control valve 17, which is better illustrated in FIGS. 5 and 6 of the drawings, controls an inlet orifice 18 in the adaptor plate 13 and linkage 19 is provided for connection to the linkage 16 of the carburetor butterfly valve hereinbefore referred to.

As customary in the art, spring means in the linkage 16 and 19, which are controlled by the accelerator, normally urges the butterfly valve in the carburetor 14 and the mechanical control valve 17 to near closed position in which the air and fuel reaching the engine is sufficient only for idling purposes and operation of the accelerator is arranged to simultaneously open the butterfly valve in the carburetor 14 and the mechanical control valve 17.

Figure 2:
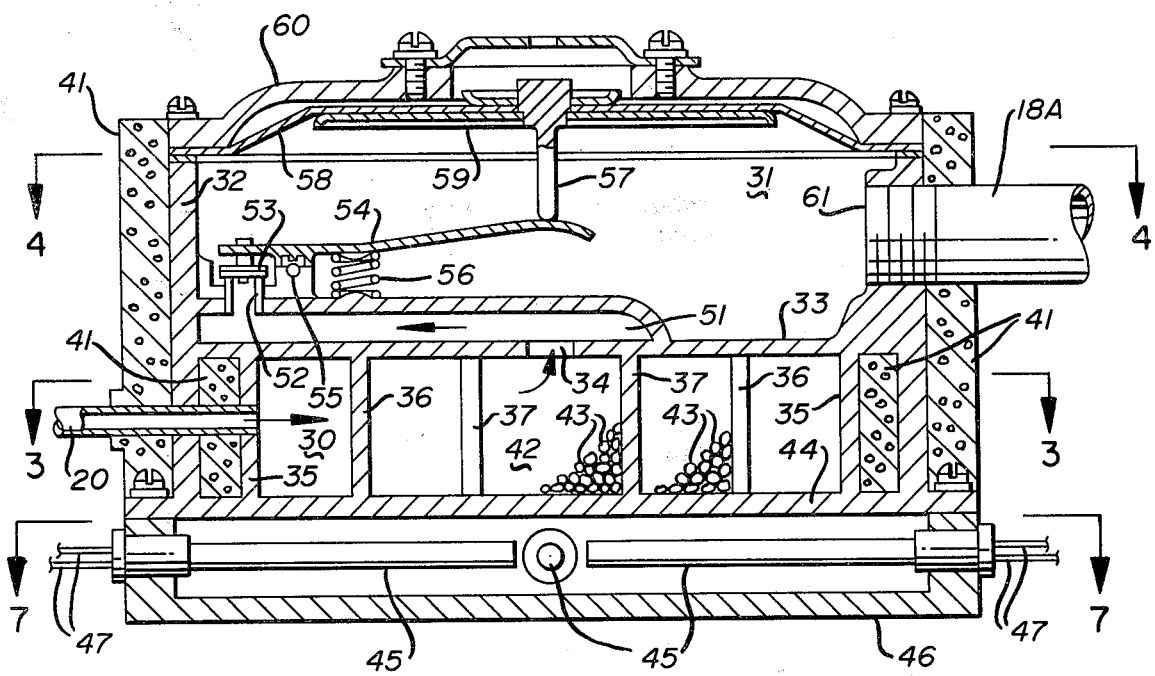
FIG. 2 is a cross sectional side elevation of a combination fuel gas generator and inlet manifold pressure responsive control valve used in the fuel system.
Figure 3:
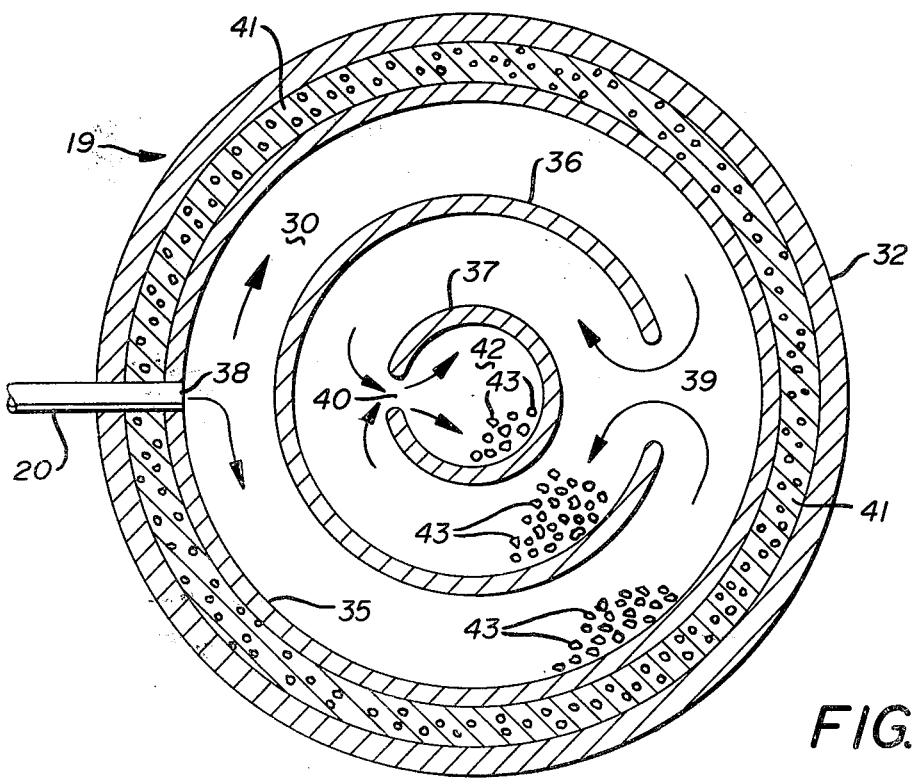
FIG. 3 is a cross section on line 3—3 of FIG. 2.
Figure 4:
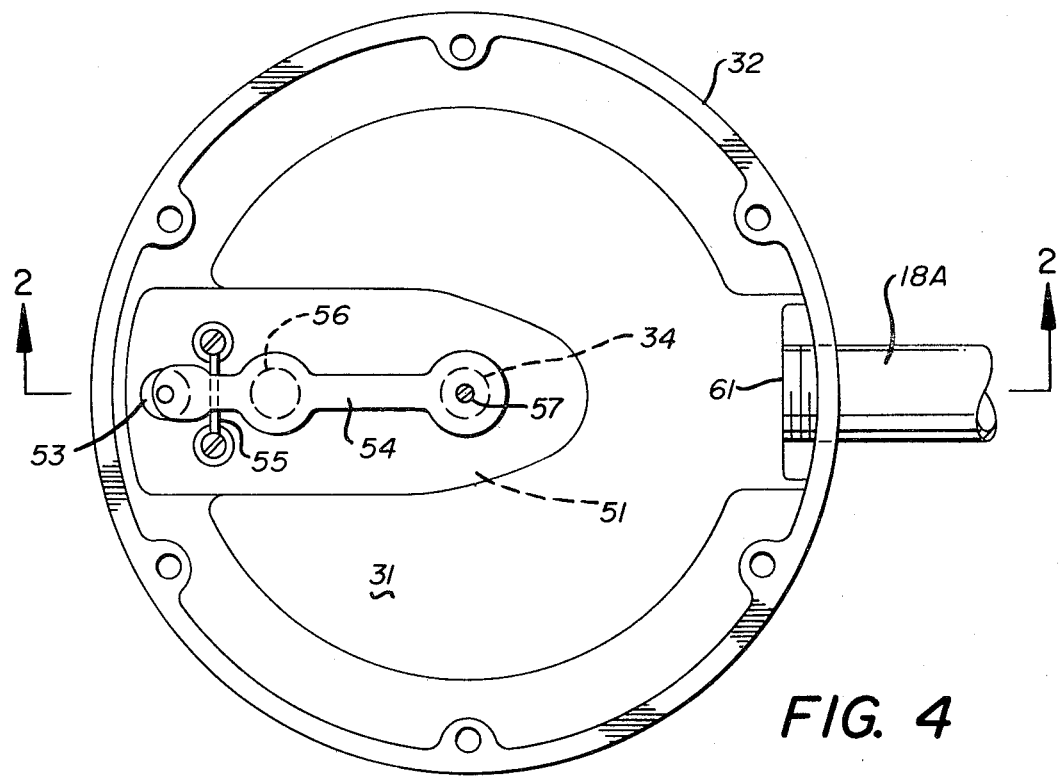
FIG. 4 is a cross section on line 4—4 of FIG. 2.

An insulated tube 18 communicates with the mechanical control valve 17 and a combination hot fuel gas generator 19 which is best illustrated in FIGS. 2,3 and 4 of the drawings and hereinafter described.

A fuel supply line 20 communicates with the hot fuel gas generator 19 by way of a pump 21, a check valve 22, and a device 23 containing an adjustable orifice.

Still referring to FIG. 1 of the drawings, it will be seen that a combination regulator and boiler 24 is placed in communication with the carburetor 14 below the butterfly valve therein by way of an insulated tube 25. The combination regulator and boiler 24 is supplied with water by a supply line 26 which incorporates a check valve 27, a pump 28, a filter 29, and extends to a reservoir such as a suitable receptacle in which water sufficient for the purpose may be carried. Alcohol as an anti-freeze is added to the water to prevent freezing of the water supply in cold weather.

The combination regulator and boiler 24 consists of a first chamber into which the water is delivered and in which an electrically energized heat exchanger in the form of a resistance heating unit is located, the heat exchanger being capable of boiling the water introduced into the combination regulator and boiler 24 and creating superheated steam, while the regulator portion of the boiler controls the delivery of the superheated steam to the insulated tube 25 and the carburetor 14, the regulator device being responsive in operation to a predetermined revolutions per minute speed of the internal combustion engine with which the fuel system is used.

By referring now to FIGS. 2 and 3 of the drawings, the hot fuel gas generator will be seen to comprise first and second chambers 30 and 31 formed in a cylindrical body 32 and separated by a horizontal partition 33. An orifice 34 in the partition 33 communicates with the central portion of the first chamber 30 which is subdivided into a plurality of interconnecting circular passageways formed by circular partitions 35, 36 and 37 respectively, which have openings 38, 39, and 40 respectively therein and arranged in oppositely disposed relation to one another. The fuel supply pipe 20 hereinbefore referred to communicates with the opening 38 in the circular partition 35 and the space between the circular partition 35 and the cylindrical body 32 of the hot fuel gas generator is filled with insulation 41. The circular partition 36 is of smaller diameter than the circular partition 35 and is accordingly spaced with respect thereto to form a circular passageway therebetween so that fuel introduced through the opening 38 must flow through the circular passageway between the partitions 35 and 36 to the opening 39 where it will flow into the circular passageway defined between the circular partitions 36 and 37 where it will then flow to the opening 40 in the circular partition 37 and into a central area 42 with which the orifice 34 communicates. Each of the circular passageways between the circular partitions 35, 36, and 37 are filled with metallic particles 43 which are in contact with one another and with the base wall 44 of the cylindrical body 32 which is immediately above a heat exchanger comprising one or more electrically energized resistance heating elements 45 in an enclosure 46 secured to the cylindrical body 32.

Figure 5:
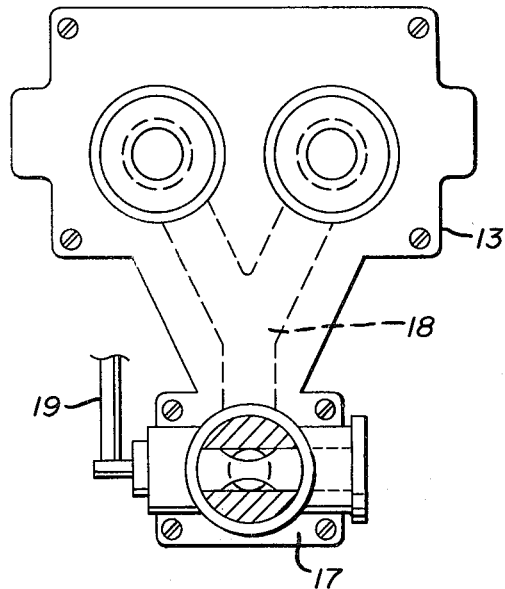
FIG. 5 is a top plan view of an adaptor plate and mechanical control valve in the fuel system.
Figure 6:
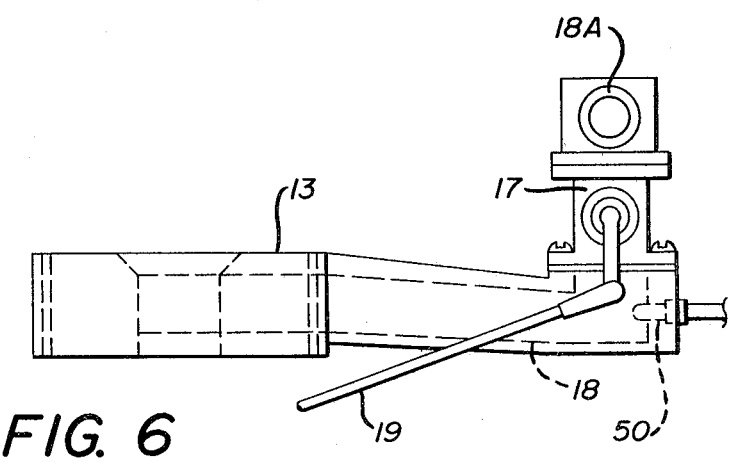
FIG. 6 is a side plan view of the adaptor plate and mechanical control valve of FIG. 5.

Electrical conductors 47 extend from the elements 45 to a control unit 48 by way of a thermostatically controlled switch 49 as best seen in FIG. 1 of the drawings, the thermostat 50 controlling the thermostatic switch 49 being positioned in the passageway 18 in the adaptor plate 13 adjacent the mechanical control valve 17 as best seen in FIGS. 5 and 6 of the drawings.

The thermostat 50 is arranged to activiate and deactivate the heating elements 45 in the hot fuel gas generator 19 so as to maintain a temperature ranging between 400° F. and 500° F. in the circular passageways defined by the circular partitions 35, 36 and 37 and heretofore described in connection with FIGS. 2 and 3 of the drawings.

By again referring to FIGS. 2,3 and 4 of the drawings, it will be seen that gasoline introduced into the first chamber 30 in the hot fuel gas generator 19 is immediately in contact with the metal particles 43 in the several interconnecting circular passageways with the result that the liquid gasoline is immediately divided into small portions and immediately vaporized and subsequently heated to a complete gaseous state and maintained at the optimum temperature. The hot fuel gas leaves the first chamber 30 centrally thereof through the aperture 34 in the horizontal partition 33 in the hot fuel gas generator 19 and moves through a passageway 51 to a vertically positioned tubular valve seat 52 which communicates with the second chamber 31 in the upper portion of the hot fuel gas generator 19. A valve element 53 carried on one end of a valve actuating lever 54 is arranged to open or close the passageway defined by the tubular valve seat 52. The valve element 54 is pivoted at 55 to a boss and a spring 56 positioned between the wall of the chamber 31 and the valve actuating lever 54 normally biases the valve element 53 to closed position. The other end of the valve actuating lever extends to a substantially center portion of the second chamber 31 where it is enlarged as best seen in FIG. 4 of the drawings and positioned immediately adjacent a depending pin 57 which is centrally attached to a flexible diaphragm 58 by a pair of circular plates 59. The peripheral edge of the flexible diaphragm 58 is positioned between the upper peripheral edge of the cylindrical body 32 and a closure 60 which includes a portion having an atmospheric vent. An opening 61 in the cylindrical body 32 of the hot fuel gas generator communicates with the second chamber 31 and thus the hot gaseous fuel can flow through the opening 61, the insulated tube 18, which communicates therewith, and to the mechanical control valve 17 and then into the passageway 18 in the adaptor plate 13 and into the inlet manifold 11 as hereinbefore described. At this point, the superheated steam being delivered to the carburetor 14 below the butterfly valve thereof by way of the insulated tube 25, mixes with the hot fuel gas and forms a practically perfect hot fuel gas mixture incorporating a controlled amount of water vapor in the form of the superheated steam which is then immediately delivered by the inlet manifold to the point of combustion in the internal combustion engine.

Figure 7:
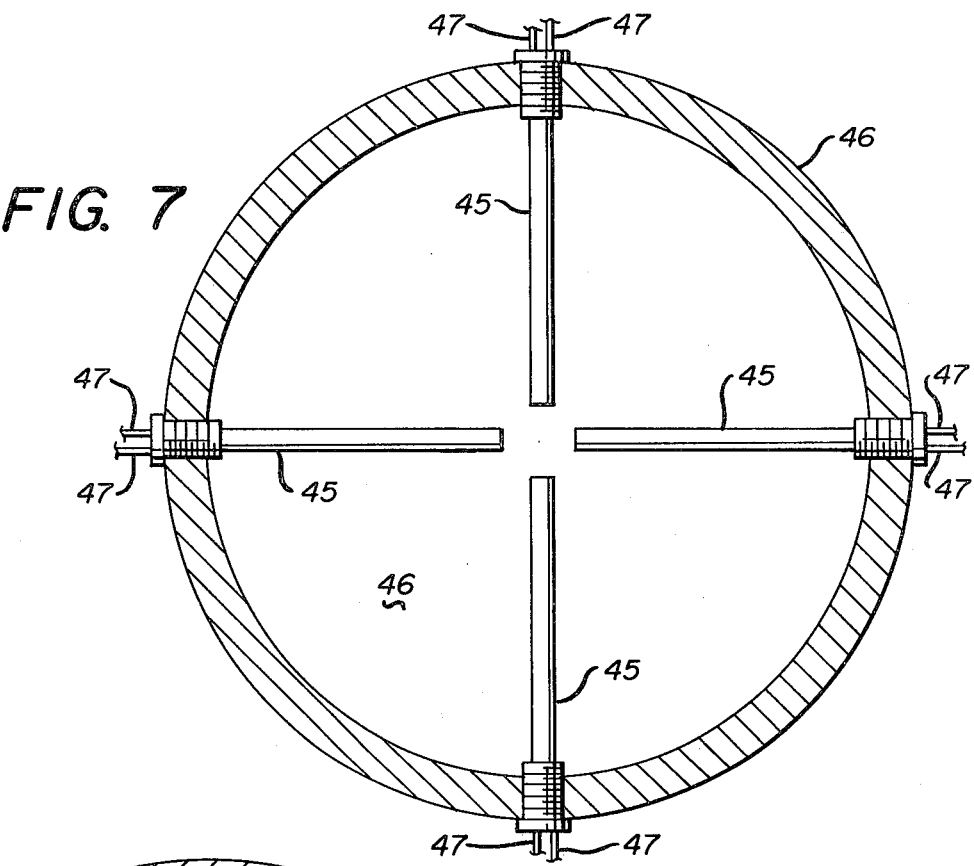
FIG. 7 is a cross section on line 7—7 of FIG. 2.

The several heating elements 45 in the enclosure 46 hereinbefore described in connection with FIG. 2 of the drawings, may be seen in the cross sectional elevation comprising FIG. 7 as consisting of elongated glow plugs adapted to establish and maintain the desired temperatures heretofore referred to when energized by a 12-volt electrical system such as found in motor vehicles.

Figure 8:
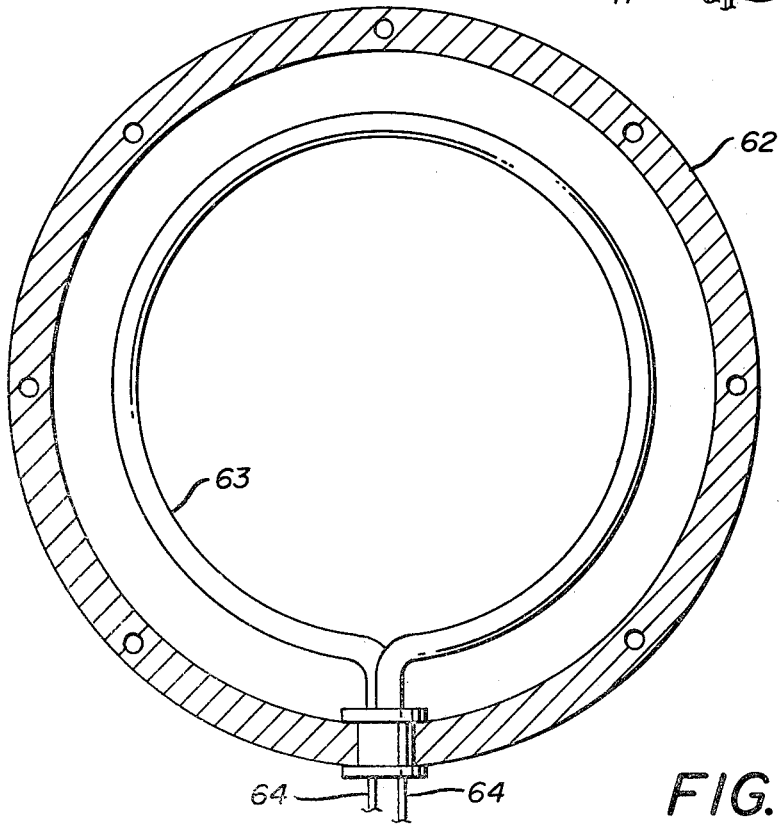
FIG. 8 is a cross section comparable to FIG. 7 showing an alternate heat source.

A modification of the heating means hereinbefore descibed in the hot fuel gas generator is possible and by referring to FIG. 8 of the drawings, an enclosure 62 will be seen which comprises a substantial duplicate of the enclosure 46 hereinbefore described in connection with FIG. 2 of the drawings with a 115-volt AC CALROD electrically energized resistance heating element 63 arranged in a circular pattern therein with the electrical conductors extending therefrom indicated by the numerals 64. The electrical energy for the modified heat source illustrated in FIG. 8 of the drawings, can comprise a solid state convertor or a motor generator set, either of which operate on the 12-volt electrical system of the motor vehicle in which the engine is supplied with fuel by the improved hot fuel gas system and hot fuel gas generator disclosed herein.

In operation, the system, as illustrated in FIG. 1 of the drawings, utilizes the control unit 48 which is supplied with the appropriate electrical energy by electrical conductors 65. Conductors 66 extend from the control unit 48 to the pump 21, which supplies the liquid fuel, such as gasoline, to the hot fuel gas generator 19 and electrical conductors 67 extend from the control unit 48 to the pump 28, which supplies the water and/or water alcohol mixture from its source, not shown, to the combined regulator and boiler 24.

Electrical conductors 68 extend from the control unit 48 to the combined regulator and boiler 24 by way of a thermostatic switch 69, the actuating thermostat 70 thereof being positioned in the boiler portion of the combined regulator and boiler 24 and arranged to maintain temperatures suitable for producing the superheated steam generated therein.

It will thus be seen that a relatively simply, yet highly efficient improved fuel system and hot fuel gas generator for an internal combustion engine has been disclosed which is able to efficiently and rapidly convert liquid gasoline to a gaseous state at an optimum temperature with an initial start-up time of a few seconds and has the ability to continuously deliver such quantities of hot gaseous fuel as required in a normal operation of a motor vehicle equipped with the device.

In operation, the internal combustion engine equipped with the fuel system and hot fuel gas generator of the invention may be started, particularly when cold, with the use of the conventional carburetor which is left in place in the retrofit comprising installing the invention on motor vehicles already in use. Such installations include the control unit 48, which is preferably arranged to also control the gasoline supplied to the regular carburetor so that in starting the regular carburetor is used to start the engine. the control unit 48 simultaneously energizes the heat exchanger 45 in the hot fuel gas generator 19 and the pump 21 in the gasoline supply line 20. The thermostatic controlled switch 49 is normally closed due to the low temperature at the location of the controlling thermostat 50 adjacent the mechanical control valve 17. When the internal combustion engine has been started and operated for a minute or so, the hot fuel gas generator 19 begins to produce hot gaseous fuel which begins to flow into the adapter plate 13 and temperature and/or revolutions per minute sensors in the control unit 48 close the valve in the gasoline supply line to the carburetor 14 and the engine then runs on hot gaseous fuel. Such a start-up procedure with the regular carburetor is unnecessary when the engine equipped with the invention is re-started after an initial warm up as the hot fuel gas generator 19 is capable of producing the desirable gasified hot fuel gas in a relatively few seconds after such initial warm up.

The control unit 48 and its revolutions per minute sensors and the overriding control switch 69 act to energize the heat exchanger in the combined regulator and boiler 24 and the pump 28 by which water and/or water and alcohol mixture is delivered to the combined regulator and boiler 24. When the desired revolutions per minute of the engine are reached, and this is a number of revolutions slightly above the revolutions associated with a so-called idling speed and/or substantially at 10 miles per hour rate of travel, the regulator portion of the combined regulator and boiler 24 opens and begins to supply a predetermined amount of superheated steam to the insulated tube 25 which communicates directly with the carburetor 14 below the butterfly valve therein as hereinbefore described. The preferred amount of superheated steam delivered by the device is varied depending upon the revolutions per minute rate of the engine so that a ratio of superheated steam of 1part to 9 parts of superheated gaseous fuel is realized. Those skilled in the art will observe that this ratio may be varied depending upon the octane rating of the gasoline fuel being used and the rpm rate of the engine and torque demand placed thereon. It has been determined that as much as 2.50 parts of superheated steam to each 9 parts of hot gaseous fuel may be used. The introduction of the superheated steam usually at temperatures in the area of 300° F. contributes to the efficiency of the device of the invention as the thermal energy required to convert fuel liquid to its vapor at a given temperature is partially supplied by the temperature of the superheated steam. This acts to considerably speed up the attainment of the latent heat of vaporization and insures the delivery of the hot gaseous fuel to the internal combustion engine in a completely gaseous state.

Tests of the improved fuel system and hot gas generator disclosed herein by the test facilities of the Ethyl Corporation of Ferndale, Mich. which are recognized by the U.S. Environmental Protection Agency as qualified for such testing, consistently show substantially more than doubling of miles per gallon of fuel as compared with the miles per gallon obtained with the carburetor equipped engine.

The improved fuel system and hot fuel gas generator of the present invention operate successfully and efficiently under hot and cold start-up conditions and at any and all revolutions per minute of engine speed or miles per hour with no stalling or failures which have characterized the prior art devices, as hereinbefore set forth.

It will thus be seen that a novel and efficient fuel system incorporating a novel and unusually efficient hot fuel gas generator has been disclosed and having thus described my invention what I claim is:

1. A fuel sypplying system for an internal combustion engine having an inlet manifold, comprising:
    a device in communication with said inlet manifold,
        air supplying means in communication with said device, a throttle valve in communication with said device, a valve responsive in operation to inlet manifold pressure upstream of said throttle valve, a hot fuel gas generator upstream of said pressure responsive valve, fuel supplying means adapted to supply liquid fuel to said hot fuel gas generator and temperature sensor means in said system adjacent said throttle valve for emitting signals representative of temperature in said system; signal comparator/controller means coupled to said sensor means; heating means positioned in said hot fuel gas generator coupled to said comparator/controller means and responsive to said signals for regulating said heating means so as to maintain known temperatures therein sufficiently to gasify said liquid fuel, said hot fuel gas generator consisting of a double chambered body member, a passageway between said double chambers, said inlet manifold pressure responsive valve upstream of said throttle valve being located in one of said chambers and controlling said passageway, said heating means located in the other of said chambers, an inlet port communicating with said other chamber, said fuel supplying means communicating with said inlet port, accelerator linkage for said internal combustion engine connected with said throttle valve so that said throttle valve finally controls the hot gaseous fuel supplied the engine through said device.

2. The fuel supplying system set forth in claim 1 and wherein said double chambered body member has a partition between said chambers, an aperture in said partition, and a movable valve element in one of said chambers controlling said aperture in said partition, a diaphragm and spring regulator in one of said chambers normally biasing said valve element to a closed position with respect to said aperture and operable to open said valve element progressively upon a reduction of pressure in said one chamber, an outlet port in said one chamber in communication with said throttle valve.

3. The fuel gas supplying system set forth in claim 1 and wherein said double chambered body member has a partition between said chambers, an aperture in said partition, said heating means located in said other of said chambers comprising at least one secondary partition dividing said other chamber into at least two secondary chambers, at least one aperture in said secondary partition and an inlet port in communication with one of said secondary chambers, said aperture in said first mentioned partition communicating with one of said secondary chambers, a heat exchanger positioned adjacent said other one of said chambers for heating said secondary partitions and said secondary chambers and loosely arranged metallic particles substantially filling said secondary chambers so as to create a plurality of tortuous passageways for liquid fuel introduced thereinto and hot gaseous fuel formed therefrom.

4. The fuel supplying system set forth in claim 1 and wherein said heating means consists of a plurality of partitions defining interconnecting passageways, particulate material substantially filling said passageways so as to create a plurality of tortuous channels for liquid fuel introduced thereinto and hot gaseous fuel formed therefrom, a heat exchanger positioned adjacent said other chamber and arranged for directly heating said interconnecting passageways and said particulate material.

5. The fuel supplying system set forth in claim 1 and wherein said heating means consists of several circular partitions dividing said other chamber into several circular passageways, said partitions arranged in spaced relation to one another and said inlet port communicating with the outermost one of said circular passageways, apertures in said circular partitions in oppositely disposed relation to one another with the innermost one of said circular passageways communicating with said passageway between said double chambers and a heat exchanger positioned adjacent said circular partitions for directly heating the same.

6. A fuel supplying system for an internal combustion engine having an inlet manifold comprising a device in communication with said inlet manifold, air supplying means in communication with said device, a throttle valve in communication with said device, a valve responsive in operation to inlet manifold pressure upstream of said throttle valve, a hot fuel gas generator upstream of said pressure responsive valve, fuel supplying means adapted to supply liquid fuel to said hot fuel gas generator and temperature sensor means in said system adjacent said throttle valve for emitting signals representative of temperature in said system; signal comparator/controller means coupled to said sensor means; heating means comprising a heat exchanger positioned in said hot fuel gas generator coupled to said comparator/controller means and responsive to said signals for regulating said heat exchanger so as to maintain known temperatures thereabout sufficient to gasify said liquid fuel, said hot fuel gas generator consisting of a double-chambered body member, a passageway between said double-chambers, said inlet manifold pressure responsive valve being located in one of said chambers and controlling said passageway, said pressure responsive valve comprising a diaphragm and spring regulator normally biasing said valve to a closed position with respect to said passageway between said double chambers and operable to open said valve progressively upon a reduction of pressure in said chamber, an outlet port in said chamber communicating with said throttle valve, said heating means being located in the other of said double chambers, an inlet port communicating with said other chamber, said fuel supply means communicating with said inlet port, water vapor supplying means, a regulating valve downstream of said water vapor supplying means, means establishing communication between said regulator valve and said device, sensor means in said internal combustion engine for emitting signals representative of the revolutions per minute of said engine; signal comparator/controller means coupled to said sensor means, said regulating valve coupled to said comparator/controller means and responsive to said signals for regulating said water vapor supply so as to supply known amounts of water vapor to said device upon a predetermined number of revolutions per minute attained by said internal combustion engine and terminating said water vapor supply when said revolutions per minute of said internal combustion engine falls below said predetermined number.

* * * * *